Jan. 10, 1967  F. STANEK ETAL  3,297,386
FOOD SERVER

Filed July 6, 1965  3 Sheets-Sheet 1

INVENTORS
FRANK STANEK
JOSEPH PAVELKA, JR.
BY
*James L. Jackson*
AGENT

Jan. 10, 1967  F. STANEK ETAL  3,297,386
FOOD SERVER
Filed July 6, 1965  3 Sheets-Sheet 3

United States Patent Office

3,297,386
Patented Jan. 10, 1967

---

3,297,386
FOOD SERVER
Frank Stanek and Joseph Pavelka, Jr., both of St. Louis, Mo., assignors to The Toastswell Company, St. Louis, Mo., a company of Missouri
Filed July 6, 1965, Ser. No. 469,824
14 Claims. (Cl. 312—270)

This invention relates generally to food servers and more particularly to sectional drawer type, warm food servers and to humidity control apparatus therefor.

Sectional food warmers are well known in the restaurant art for maintaining food at selective predetermined temperatures under sanitary conditions. It has been found, however, that there is a need not only to control the temperature of the food, but also to control the humidity of the food, as well. Heretofore there has not been available a sectional drawer type warm food server incorporating simple mechanical means for the maintenance of desired humidity. Accordingly, it is among the several objects of this invention to provide a novel food warmer construction incorporating a mechanical means for the maintenance of desired ranges of humidity of the food and electrically energized structure for controlling the food temperature.

Another object of this invention includes the provision of a food crisper lid for the drawer which is retained within the food server and which is automatically positioned in sealing relation on the drawer responsive to movement of the drawer to its closed position therefore providing a sanitary cover for protecting the food.

A more specific object of this invention involves the provision of a novel cripser lid construction which is adapted to engage the food pan in the closed position of the drawer and which is prevented from frictionally engaging the food pan during movement of the drawer frame.

Among the several objects of this invention may be noted the provision of a food warmer construction including a novel simple mechanical structure for controlling the humidity of the food product within the food pan.

It is another object of this invention to provide a novel food warmer construction having a drawer locking structure for maintaining the drawer biased to its closed position.

Briefly the invention comprises a generally rectangular insulated enclosure which may be internally heated and which has at least one drawer opening therein. A drawer frame carrying a removable food pan is carried by telescoping supports fixed to a skeletal frame work disposed within the enclosure and is movable between a closed position, where the drawer frame is disposed within the drawer opening, and an open position, where the drawer frame is in a captive position completely extended from the drawer opening. A crisper lid is pivotally retained within the enclosure and is adapted selectively to rest upon the food pan in the closed position of the drawer thereby sealing the same for controlling the humidity of the food product. Movement of the drawer from its closed position will automatically pivotally raise the crisper lid clear of the food pan to facilitate friction-free opening of the drawer. The crisper lid is also adapted for selective positioning by manual selection to a number of positions relative to the food pan to control the humidity of the food product within the food pan. The food warmer construction is also provided with novel drawer locking mechanism which will effectively maintain the drawer in a biased condition when closed to assure proper sealing of the enclosure against the loss of heat from within the container.

Other and further objects of this invention will become obvious to one skilled in the art upon an understanding of the illustrative embodiment about to be described or will become inherent upon employment of the invention in practice.

In the drawings in which an illustrative embodiment of the invention is illustarted:

Corresponding reference characters designate corresponding parts throughout the several views of the drawings.

Figure 1:
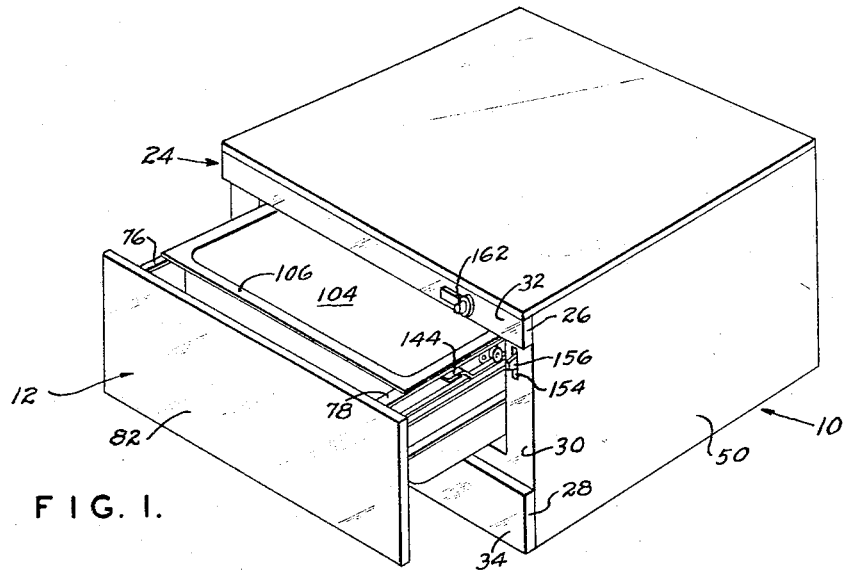
FIGURE 1 is an isometric view of a food warmer constructed in accordance with the spirit of the present invention.

As illustrated in FIGURE 1 a generally rectangular enclosure 10 for maintaining food under sanitary heated conditions is formed by insulated wall panels and carries a drawer structure 12 shown partially extended from the enclosure 10. While a single drawer modulary section is illustrated in FIGURE 1, it is to be understood that one or more heated or unheated modulary single drawer sections may be stacked one upon the other to achieve a multiple drawer unit. For a more detailed description of the construction which makes possible the stacking of modulary sections, reference may be had to U.S. Patent No. 2,942,926.

Figure 2:
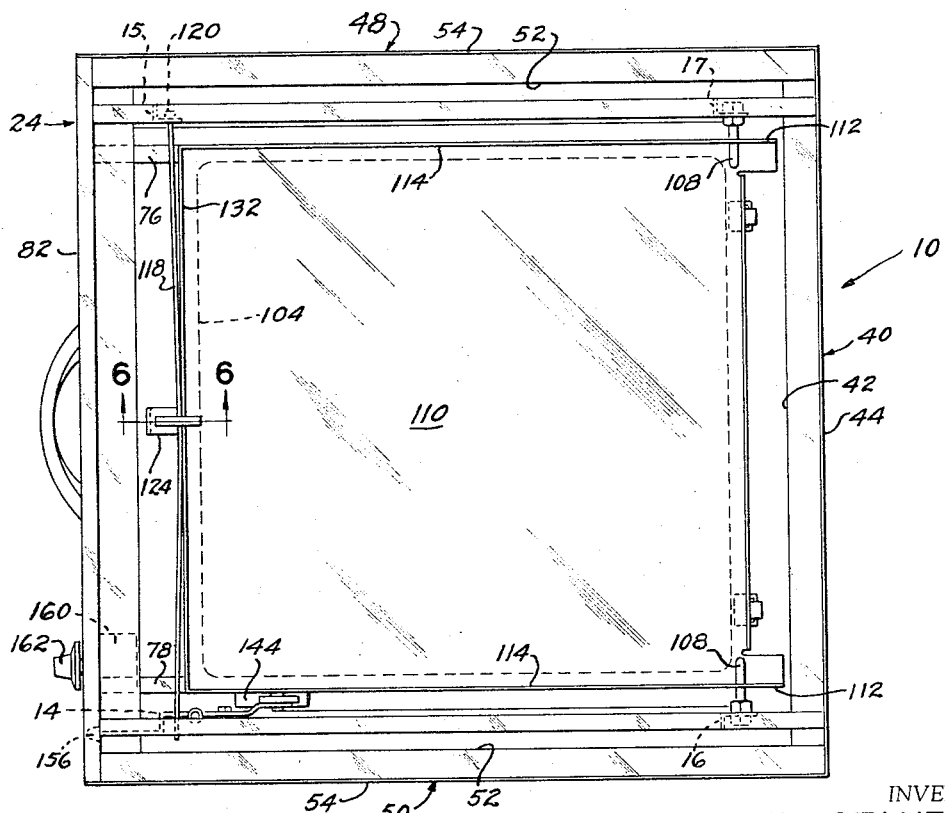
FIGURE 2 is a sectional view in plan illustrating the crisper lid control construction in detail.
Figure 3:
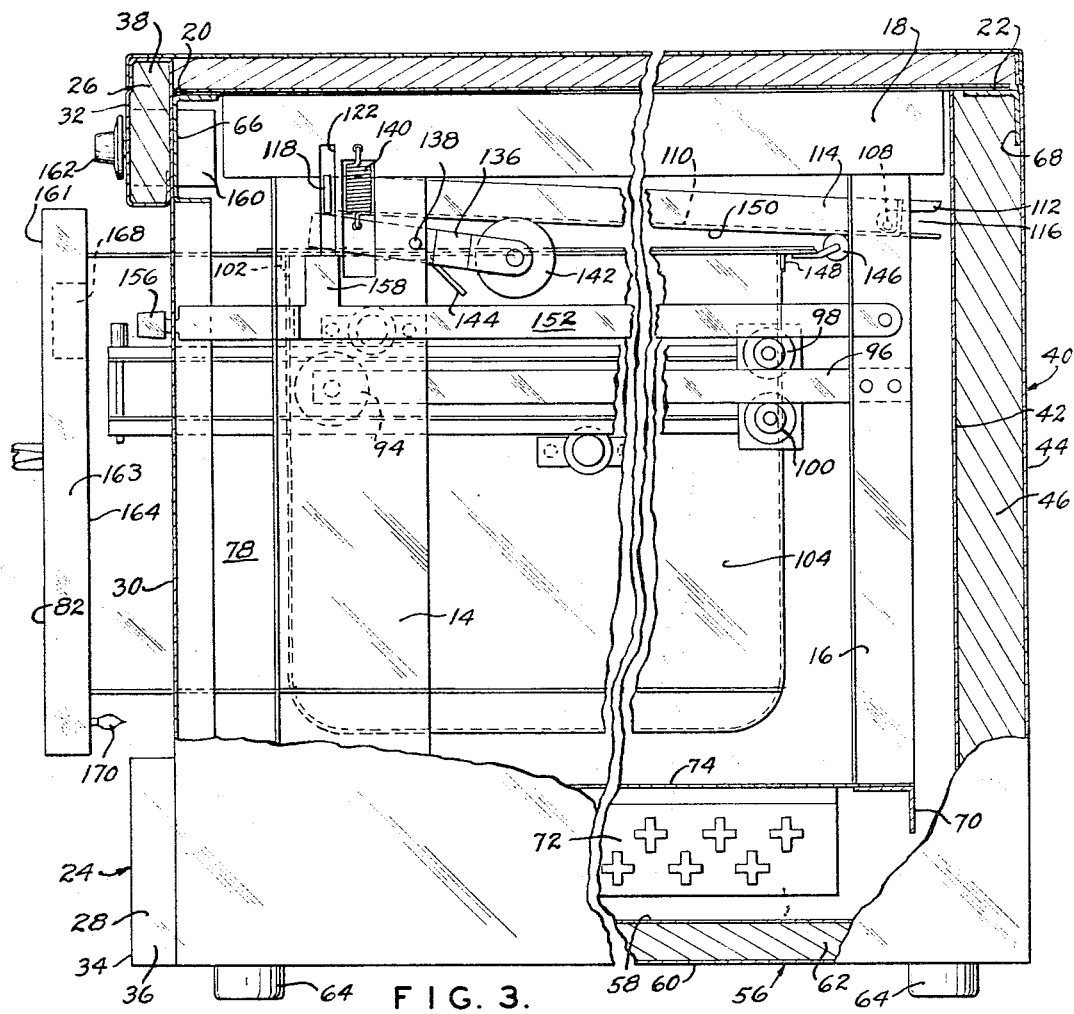
FIGURE 3 is a partial elevational view of the construction of FIGURE 1 having portions thereof broken away and shown in section.
Figure 4:
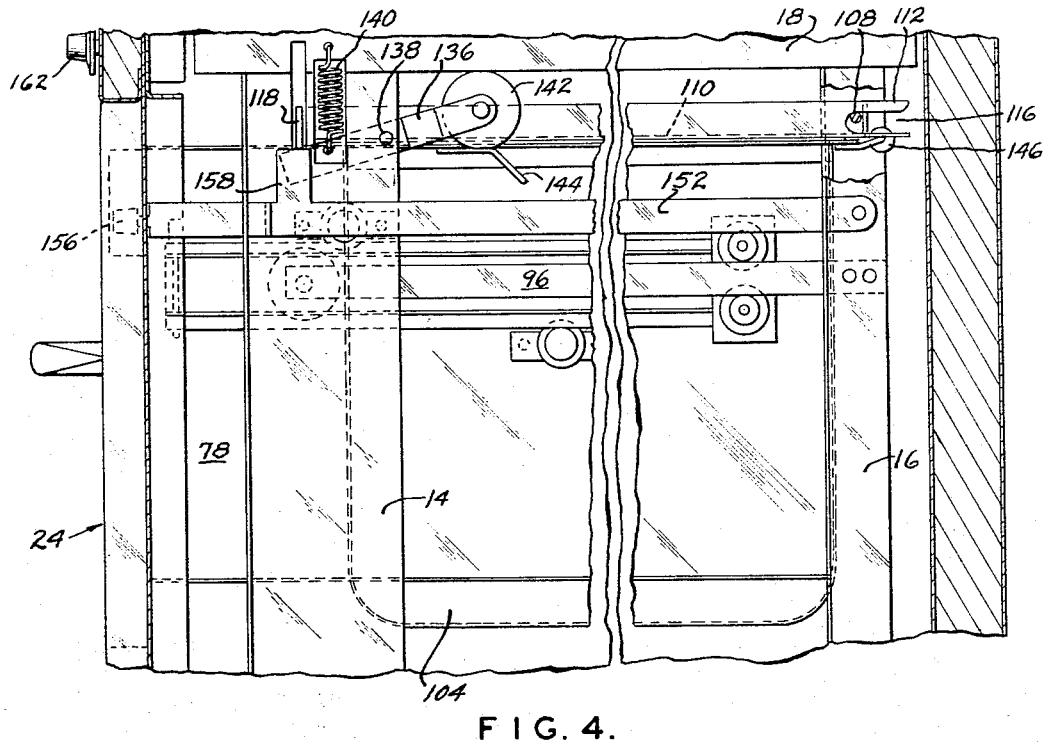
FIGURE 4 is an enlarged partial right side elevational view of the construction of FIGURE 1 having portions thereof broken away and shown in section.

Referring now to FIGURES 2, 3, and 4 for a better understanding of the invention, the modulary drawer section 10 includes a skeletal structural framework comprising a front pair of vertical supports 14 and 15 and a rear pair of vertical supports 16 and 17, which are fixed at their upper extremities to and depend from substantially horizontal cross bars 18. The cross bars 18 have front 20 and rear 22 extended portions thereof which rest upon and are fixed respectively to the front and rear wall structures of the enclosure 10.

As illustrated in FIGURE 3 a front wall 24 of the enclosure 10 is formed by upper and lower insulated portions 26 and 28 respectively which are supported by a front panel sheet 30 and which cooperate with the panel sheet 30 to define a rectangular drawer opening. The upper and lower insulated portions of the front wall 24 are defined by channel like formed sheet metal members 32 and 34 fixed to the panel sheet 30 which form enclosures for sheets 36 and 38 respectively of insulation material such as glass wool or the like. A rear wall 40 of the enclosure 10 is formed by inner and outer spaced metal facings 42 and 44 between which is disposed a heat-insulating filling sheet 46. A pair of generally parallel side walls 48 and 50 respectively are interconnected with the front and rear walls defining a box-like enclosure and include inner metal facings 52 and outer metal facings 54 which entrap a substantial thickness of suitable heat-insulation material. A bottom heat-insulated wall structure 56 forming the lower wall of the enclosure 10 is formed by inner and outer metal facings 58 and 60 having a sheet of heat-insulation material 62 disposed therebetween. For supporting the enclosure 10 in spaced relation on a supporting surface a number of support pads 64 are affixed to the bottom wall 56. The support pads 64 may be metal if desired but frequently are formed of rubber or the like for the resilience and insulation value of the same.

On the interior portion of the front wall panel sheet 30 is fixed a channel member 66 (FIGURE 3) which serves to strengthen the front wall structure and to form a support for the extended portions 20 and 22 of the upper cross bars 18. The extended portions 20 and 22 of the upper cross bars are supported upon an angle structural member 68 which forms the upper surface of the rear wall 40. The skeletal framework including the vertical supports 14, 15, 16, and 17 is therefore supported by the side wall structures of the enclosure in spaced relation to both the side walls and bottom wall to allow the circulation of heated air about the framework as described in detail hereinbelow.

As illustrated in FIGURE 3, lower crossbars 70 are fixed to the lower extremities of the vertical support members 14, 15, 16, and 17 and support electrically energized heating units 72 therebetween for maintaining heat within the enclosure within a preselected temperature range. The electric heating units may be of the electric resistance type but any of various acceptable types of heating units may be successfully employed without departing from the spirit or scope of the instant invention. For a more detailed description of a satisfactory type of electrically energized heating unit, reference may be had to U.S. Patent No. 2,942,926. A heater cover plate 74 is fixed to the lower cross members 70 by screws or the like and serves to prevent heat carried by convection currents from impinging directly on the lower surface of the food pan as will be discussed in detail hereinbelow.

As indicated hereinabove, each of the modulary stacked enclosures includes a drawer frame structure 12 (FIGURES 1 and 7) which is carried by the enclosure 10 and is movable between a closed position within the enclosure and an open position where the drawer structure is fully extended from the enclosure. The drawer structure comprises a generally rectangular framework having generally parallel side members 76 and 78 between which are fixed a rear wall 80 adjacent one extremity thereof. The side members 76 and 78 fixed at the other extremity thereof to a heat-insulated panel 82 defining the front wall of the drawer 12. The insulated panel 82, when the drawer 12 is in its closed position, will be disposed substantially coplanar with the upper and lower front wall sections 26 and 28 thereby providing a relatively planar front wall 24.

Figure 7:
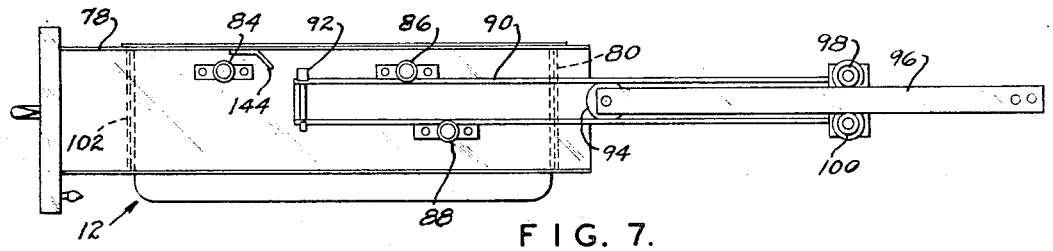
FIGURE 7 is an elevational view of the drawer support structure of the food warmer of FIGURE 1.

Each of the side members 76 and 78 are provided with a series of rollers or anti-friction bearings for supporting the drawer frame for ease of movement as illustrated in FIGURE 7. For the purpose of clarity only one of the drawer supports being substantially identical. A series of roller bearings 84, 86, and 88 are rotatably mounted on each of the side members for supporting the drawer frame upon a roller track 90. A stop member 92 having a shock absorber of rubber or the like thereon is fixed to one extremity of the roller track 90 and is engageable either by the front roller 84 or the upper rear roller 86 to limit movement of the drawer frame 12 relative to the roller track 90. In normal extension of the drawer frame the rollers will allow movement of the drawer frame relative to the track 90 until the front roller 84 engages the stop member 92. If further extension of the drawer frame is desired, for example for cleaning, etc., the front portion of the drawer frame is raised thereby causing it to pivot on the roller 88 until the stop member 92 will pass under the roller 84. The drawer frame is then moved outwardly on the roller track 90 until the roller 86 comes into contact with the stop member 92 thereby preventing further outward movement of the drawer frame. As illustrated in FIGURE 7 the drawer frame 12 is extended to a position intermediate its normal and maximum extended positions. The drawer frame may then be completely removed from the roller track simply by raising the front of the drawer frame causing pivoting of the drawer frame about the roller 88 sufficiently to allow passage of the roller 86 over the stop pin 92. Such disassembly may be necessary for thorough cleaning, lubrication, or repair of the drawer frame and support assembly.

The roller track 90 is generally C shaped when viewed in cross section and receives a roller 94 therein which roller is rotatably supported at one extremity of a slide bar 96 fixed to the vertical support members 14 and 16 of the skeletal framework. A pair of oppositely disposed anti-friction roller bearings 98 and 100 are rotatably mounted at the other extremity of the roller track 90 and engage opposite sides of the slide bar 96 thereby cooperating with the roller 94 for supporting the roller track 90 on the slide bar 96. It is readily seen that the drawer frame is supported from the skeletal frame work by the telescoping arrangement of the slide bar 96 and roller track 90 and that the drawer frame is extendable to two captive positions relative to the enclosure 10 or may be completely disassembled from the enclosure without aid of tools.

A cross brace 102 (FIGURE 3) fixed to the side members 76 and 78 of the drawer frame 12 cooperates with the side members and with the end wall member 80 to define a generally rectangular opening for telescopically receiving a food pan 104. A flange 106 formed about the top of the food pan 104 rests on the upper margin of the structural members defining the opening. The food pan 104, since it merely rests on the structural members, may be easily removed from the drawer frame 12 for cleaning or for other purposes, as desired.

In accordance with a feature of this invention, a pair of opposed pivot pins 108 (FIGURE 2) are fixed to the vertical supports 16 and 17 adjacent the upper extremity thereof. A crisper lid 110 formed of substantially rectangular planar sheet metal and having its marginal edges turned to form a peripheral flange, is pivotally retained at its rear portion by the pivot pins 108. The connection between the pivot pins and the crisper lid is provided by bifurcations formed by a pair of support tabs 112 which cooperate with the side flanges 114 to define pivot slots 116 in which the pivot pins are placed. As illustrated, particularly in FIGURE 3, the pivot slots 116 are substantially wider than the diameter of the pivot pins 108 thereby allowing vertical movement of the crisper lid relative to the stationary pivot pins as will be explained in detail hereinbelow.

Figure 5:
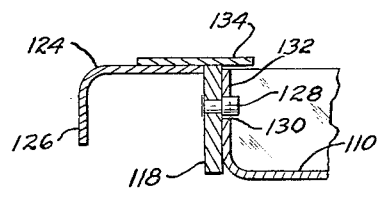
FIGURE 5 is a partial sectional view of the crisper lid locking structure taken along lines 5—5 in FIGURE 2.

A crisper lid control bar 118 is connected at one end thereof by a pivot 120 to the vertical support members 15 and has its free extremity extending through a slot 122 in the vertical support 14. The control bar 118 is normally bowed into engagement with the crisper lid 110 to support one end of the same as will be discussed below. The control bar has a crisper lid lock 124 fixed thereto intermediate its extremities which releasably locks the crisper lid to the control bar during normal operation. The crisper lid lock 124 as illustrated in greater detail in FIGURE 5 is generally L shaped and has a depending portion 126 which may be manually grasped for straightening the spring bar 118 against its bias for releasing the locking engagement between the bar 118 and the crisper lid. A small support pin or locking projection 128 is carried by the control bar 118 and is adapted to mate with a locking opening 130 formed in the front flange 132 of the crisper lid 110 for locking the front portion of the crisper lid to the control bar 118. For ease in positioning the locking pin 128 within the opening 130 a locator member 134 is fixed to the crisper lid lock 124 and has a portion thereof projecting normally over the flange 132.

During installation of the crisper lid within the enclosure 10 the drawer frame 12 with the food pan 104 positioned therein is moved to its fully extended position with the roller bearing 86 in stopping engagement with the stop member 92. The crisper lid is then inserted in the drawer opening and is allowed to slide on the roller track 90 with the pivot slots 116 directed toward the pivot pins 108. Due to the width of the pivot slots relative the diameter of the pivot pins 108, the slots will readily receive the pins. With the pivotal engagement between the crisper lid 110 and the enclosure established, the operator reaching through the drawer opening will grasp the depending portion 126 of the crisper lid lock 124 and apply force in the direction of the drawer opening. This manual application of force will cause the control bar 118 to straighten against its bias thereby allowing clearance between the control bar 118 and the flange 132 of the crisper lid 110. The operator, reaching through the drawer opening, will then raise the front portion of the crisper lid until the upper portion of the flange 132 engages the locator member 134. At this point the operator will release the manual pressure on the depending portion 126 thereby allowing the locking bar to flex toward its normal position, causing the locking projection 128 to enter the flange opening 130. The spring-like control bar 118 will bias the crisper lid 110 to its FIGURES 2 and 3 position and maintain tight engagement with the crisper lid flange 132 thereby preventing disconnection between the flange 132 and the crisper lid lock 124. Removal of the crisper lid 110 for the purpose of cleaning is accomplished simply by reaching through the drawer opening with the drawer fully open and grasping the depending portion 126 of the lid lock 124. As the lid lock is manually forced toward the drawer opening to straighten the control bar 118, the locking projection 128 will become disengaged from the opening 130 and the forward end of the crisper lid will drop to rest on the roller track 90. The pivot pins 108 will be disengaged from the slots 116 as the crisper lid is manually removed through the drawer opening.

In accordance with a primary feature of this invention as best illustrated in FIGURES 3 and 4 a mechanism is provided for automatically positioning the crisper lid in sealing relation upon the flange 106 of the food pan 104 in response to closing of the drawer 12. A control lever 136 is connected intermediate its extremities to the vertical support 14 by a pivot pin 138. A spring 140 is connected between the cross bar 18 and the control lever 136 and biases one end of the lever into engagement with the free extremity of the control bar 118 and thereby normally is operative to maintain the control bar 118 at the upper end of the slot 122. A roller 142 is pivotally disposed at the end of the control lever opposite the spring connection and is adapted for operative engagement with a cam member 144 fixed to the side member 78 of the drawer frame for causing pivoting of the control lever 136 against the bias of the spring 140. The cam 144 will cause pivoting of the lever arm sufficiently to allow the control bar 118 to descend by gravity to its lowermost position at which position the crisper lid will sealingly engage the flange 106 of the food pan 104. As the drawer is opened the roller 142 will become disengaged from the cam 144 allowing the spring 140 to pivot the lever 136 thereby causing the control lever to move the control bar and the crisper lid to the FIGURE 3 position. The crisper lid therefore is automatically raised over or lowered upon the food pan to clear or to seal the same responsive to positioning of the drawer.

To allow vertical clearance between the rear of the food pan 104 and the crisper lid 110 during opening and closing movements of the drawer, a plurality of small rollers 146 are fixed to the rear flange 148 of the drawer frame. The rollers 146 are so disposed relative to the drawer frame that their engagement with the lower surface 150 of the crisper lid 110 will cause the crisper lid to be raised slightly above the food pan. This construction effectively prevents sliding engagement between the crisper lid and the food pan which would otherwise result in wear on the surfaces in contact and which may cause undesirable noise. The rollers 146 are disposed rearwardly beyond the flange 148 so that the rollers, in the closed position of the drawer, will be disposed beyond the crisper lid, allowing the rear portion of the crisper lid to rest on the food pan. Vertical movement of the rearmost portion of the crisper lid relative to the pivot pins 108 is allowed because of the wide pivot pin slot 116.

For heating the food product within the food pan 110, air trapped within the enclosure 10 is heated by the electrically energized heater 72. The skeletal frame is spaced on all sides, top and bottom, from the wall structures of the enclosure thereby providing passages under, around, and over the food pan for conducting the heated air which circulates by convection. A variable thermostat 160 within the enclosure 10 is operative to maintain the heat within the enclosure within a specific temperature range which may be manually adjusted by positioning a temperature selector dial 162.

In accordance with another feature of this invention, for controlling the humidity of food product within the food pan 110, a humidity control rod 152 (FIGURE 9) is pivotally connected at one extremity thereof to the vertical support 16 and has its other extremity extending through a slot 154 in the front panel sheet 30 as viewed in FIGURE 1. A control knob 156 is fixed to the free end of the control rod 152 thereby suiting the same for manual control. A projection 158 formed on the control rod 152 has an upper surface thereof in underlying relationship with an extended portion of the crisper lid control bar 118. The humidity control rod 152 is positionable in a number of positions, its movement being limited by the upper and lower ends of the slot 154. As viewed in FIGURE 4 the rod 152 in its lowermost position locates the upper surface of the projection 158 out of possible contact with the control bar 118 thereby allowing the bar 118 and the crisper lid 110 to descend to their lowermost position to rest on and seal the food pan against loss of humidity therein. Substantially none of the heated air circulated within the enclosure will be allowed to enter the food pan under these conditions and the food product will remain at its peak of humidity for an extended period of time.

Figure 8:
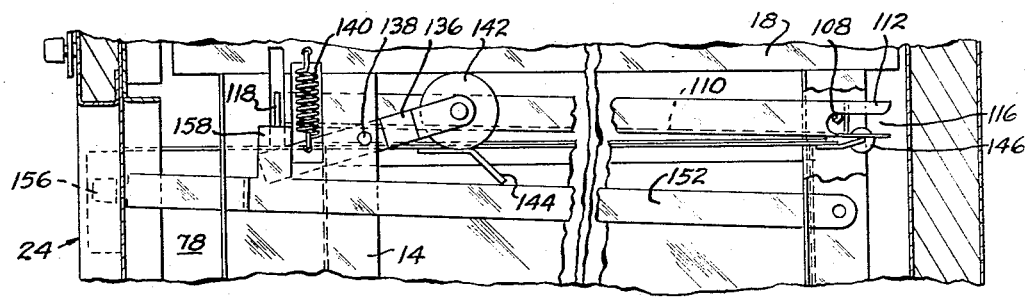
FIGURES 8 and 9 are partial elevational views of the food warmer of FIGURE 1 in section, illustrating operation of the novel crisper lid control structure of the invention.

Assuming that a slightly lesser degree of humidity is desired, the operator will grasp the control knob 156 and move the control rod 152 from its lowermost position (FIGURE 4) to an intermediate position as illustrated in FIGURE 8. When in an intermediate position the control rod 152 will locate the projection 158 in such a position that the control bar 118 will engage the projection and will be thereby prevented from moving to its lowermost position. The control bar 118, through the crisper lid lock 124 will prevent the front portion of the crisper lid from fully seating on the flange 106 of the food pan 104. The rear portion of the crisper lid 110 will, under these circumstances, rest on the food pan structure and the crisper lid will thereby rest in an inclined relation with the planar flange 106 of the food pan 110. A limited amount of the heated air moving by convection within the spaces between the food pan and the walls of the enclosure will be allowed to circulate within the food pan and absorb a limited amount of moisture from the food product.

Figure 9:
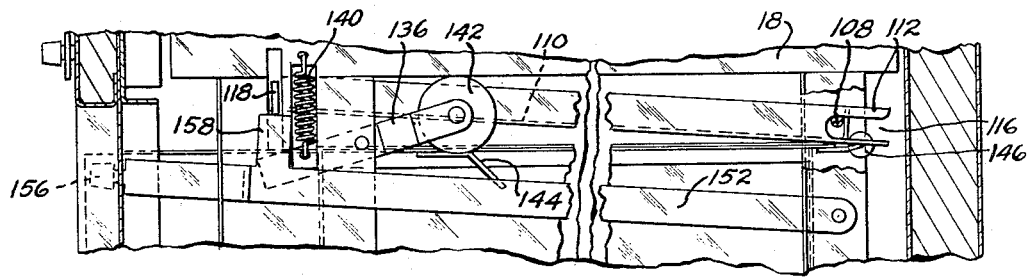

If it is desired to maintain the food product at a condition of maximum crispness, the control rod 152 is raised to its uppermost position as illustrated in FIGURE 9, thereby causing the projection 158 to raise the control bar and the front portion of the crisper lid to a position substantially elevated with respect to the food pan. Under this condition of maximum elevation of the front portion of the crisper lid, the rear portion thereof again will remain in contact with the food pan. At this position of maximum inclination with respect to the plane defined by the planar flange 106 of the food pan 104, a maximum amount of heated air will be allowed to circulate through the food pan thereby maintaining the food product within the food pan at a maximum degree of crispness.

With the control 152 maintained in its upermost position (FIGURE 9) automatic raising and lowering of the crisper lid responsive to opening and closing of the drawer frame will not occur since the control lever in its upper or lower position will not come into contact with the control bar 118. The rear portion of the crisper lid will be raised upon opening of the drawer frame and will clear the food pan because of contact between the rollers 146 and the bottom planar surface 150 of the crisper lid. The rollers, engaging the crisper lid will raise the crisper lid in the same manner described hereinabove.

In accordance with another feature of this invention, a humidity control cover and drawer locking mechanism is provided which will maintain the drawer construction of the enclosure biased in its closed position thereby providing a proper seal between the drawer and enclosure to prevent the loss of heat from the enclosure. The insulated drawer panel 82 is formed by an outer sheet metal panel 161 having its marginal edges folded to form an integral peripheral flange 163 thereabout. Within the flange 163 is fixed an inner sheet metal panel 164 and which cooperates with the panel 161 to entrap a substantial thickness of suitable insulation material 166. The panel 164 is provided with a depression 168 therein to receive the control knob 156 thereby preventing inadvertent movement of the humidity control rod 152 in the closed position of the food warmer enclosure.

Figure 6:
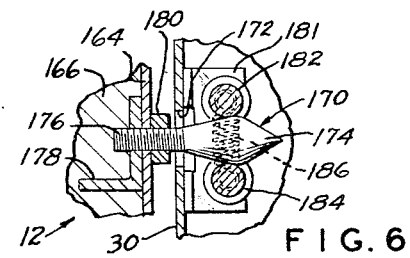
FIGURE 6 is a partial sectional view of the food warmer construction of FIGURE 4 illustrating the drawer locking structure in detail.

A drawer locking construction, illustrated generally at 170 in FIGURE 6, includes a locking pin 174 which has a threaded shank portion 176 threadedly received within a threaded aperture formed in an angular structural support member 178. The structural support 178 may be fixed to the panel 164 in any desired manner, for example, by spot welding or by screws or the like, as desired. A lock nut 180 threaded onto the shank 176 is effective to lock the locking pin 174 in any desired position and makes possible longitudinal adjustment of the locking pin as desired. The locking pin 174 is provided with an enlarged integral locking head which is tapered at either end from an enlarged diameter located intermediate its extremities which head is adapted to extend through an aperture 172 formed in the front panel sheet 30 of the enclosure 10. A generally U shaped lock bracket 181 is fixed to the panel 30 by spot welding, by screws, or the like, and carries a pair of rollers 182 and 184 mounted for vertical movement thereon. The rollers may be provided with axes which are movably received within elongated opposed slots in the bracket 181 or may be mounted on the bracket 181 in any other desired manner to allow free relative movement of the rollers 182 and 184 one relative to the other. A pair of springs 186 are received by the rollers 182 and 184 and serve to bias the rollers toward one another. In closing the drawer 24 the forward portion of the locking pin head will cam the rollers apart against the bias of the springs 186 causing the rollers to roll over the enlarged portion of the locking pin and rest upon the decreasing rearward tapered portion of the locking pin head. As illustrated in FIGURE 6 the drawer 12 is in its closed position. In the closed position the rollers will rest on the decreasing tapered surface and will be biased into tight engagement with the decreasing tapered surface by the springs 186 thereby imparting a resultant moment to the locking pin 174 in the closed direction of the drawer 12. The drawer, therefore, is biased in its closed position by the drawer locking construction 170 against inadvertant opening of the drawer 12 thereby maintaining a seal between the drawer and enclosure to prevent loss of heat and humidity from the enclosure.

The novel drawer locking construction also compensates for wear between the drawer and enclosure constructions or wear of the locking construction itself. As wear occurs allowing slightly further entry of the drawer into the enclosure, the rollers 182 and 184 will merely come to rest further down the tapered inner surface of the locking head. The result will be only a slightly lesser degree of bias between the rollers thereby slightly lowering the moment urging the drawer toward its closed position. Wear of the drawer locking assembly will likewise be compensated and will result in a slightly lower resultant sealing bias between the drawer and the enclosure. For adjustment of the locking assembly the lock nut 180 is loosened and the locking pin 174 may be longitudinally adjusted as desired. The lock nut 180 is then retightened to positively secure the locking pin in the adjusted position.

In view of the foregoing it is clearly evident that the novel food warmer construction is provided with simple and reliable mechanical structure which will effectively control the humidity of a food product disposed therein in addition to controlling the temperature of the food product. The food warmer construction is also provided with a cover means to prevent inadvertent movement of the humidity control structure in the closed position thereof. The novel food warmer construction is also provided with simple mechanical structure for automatically raising or lower a captive crisper lid relative to a food pan responsive to opening or closing of the drawer of the enclosure. Additionally the food warmer construction is provided with a simple mechanical drawer locking construction which effectively prevents inadvertent opening of the drawer and which serves to bias the food drawer closed in the closed position of the drawer. It is readily seen, therefore, that the several objects of the invention are achieved and other advantageous results attained.

While the preferred embodiment of this invention has been illustrated and described herein, it is obvious that various desired changes may be made in the disclosed construction without departing from the spirit or scope of the invention. It is, therefore, intended that all matter contained in the above description or shown in the accompanying drawings shall be interpreted as illustrative and not in a limiting sense.

We claim:

1. A food server construction comprising an enclosure having front and rear walls and a pair of side walls, the front wall having at least one drawer opening therein, a drawer supported by the side walls and being movable from a closed position within the opening to and extended captive position beyond the opening, a food pan carried by said drawer and being removable therefrom, a crisper lid disposed within the enclosure and being pivoted at one end thereof on the side walls adjacent the rear wall, means retaining the other end of the crisper lid, said means cooperating with said drawer frame to support said other end of the crisper lid in inclined relation with the food pan in positions other than the closed position of the drawer and to allow the crisper lid to rest on the food pan in the closed position of the drawer thereby sealing the food pan.

2. A food server construction comprising an enclosure having front and rear walls and a pair of side walls, the front wall having at least one drawer opening therein, a drawer supported by the side walls and being movable from a closed position within the opening to and extended captive position beyond the opening, a food pan carried by said drawer and being removable therefrom, a crisper lid disposed within the enclosure and being pivoted at one end thereof on the side walls adjacent the rear wall, means retaining the other end of the crisper lid, said means cooperating with said drawer frame to support said other end of the crisper lid in inclined relation with the food pan in positions other than the closed position of the drawer and to allow the crisper lid to rest on the food pan in the closed position of the drawer thereby sealing the food pan, said enclosure including means for maintaining said crisper lid in a preselected inclined relation with the food pan in the closed position of said drawer to vary the humidity of a food product within the food pan.

3. A food server construction comprising an enclosure having front and rear walls and a pair of side walls, the front wall having at least one drawer opening therein, a drawer supported by the side walls and being movable from a closed position within the opening to and extended captive position beyond the opening, a food pan carried by said drawer and being removable therefrom, a crisper lid disposed within the enclosure and being pivoted at one end thereof on the side walls adjacent the rear wall, means retaining the other end of the crisper lid, said means cooperating with said drawer frame to support said other end of the crisper lid in inclined relation with the food pan in positions other than the closed position of the drawer and to allow the crisper lid to rest on the food pan in the closed position of the drawer thereby sealing the food pan, said enclosure including means for maintaining said crisper lid in a preselected inclined relation with the food pan to allow the circulation of heated air through said food pan to vary the humidity of a food product within the food pan, means biasing said drawer into sealing engagement with said enclosure in the closed position of said drawer.

4. A food server construction comprising insulated walls defining an enclosure, at least one drawer opening in the enclosure, a drawer frame supported by the enclosure and being movable between open and closed positions relative to the enclosure, a food pan carried by said drawer frame, a structural frame work within the enclosure, said frame work including front and rear pairs of vertical supports, a crisper lid pivoted at one end thereof on said rear vertical supports and adapted to rest upon and seal said food pan in the closed position of the drawer, a control bar pivoted at one end thereof on one of the vertical supports, means removably supporting the other end of the crisper lid on the control bar, means responsive to opening of said drawer for raising the free end of the control bar to raise the crisper lid from its sealing engagement with the food pan and responsive to closing of the drawer for allowing said crisper lid to move into sealing engagement with the food pan.

5. A food server construction as set forth in claim 4; said crisper lid having at least one flange, said flange having an aperture therein, said means for removably supporting the other end of the crisper lid on the control bar comprising a support pin removably fixed on the control bar and received within the aperture, said control bar having a slight curvature and normally applying a bias to said crisper lid to prevent inadvertant separation of the support pin from the aperture.

6. A food server construction as set forth in claim 4; said means responsive to opening of said drawer for raising the free end of the control bar comprising a control arm pivoted intermediate its ends on the other of the vertical supports, one end of the control arm disposed for engagement with said control bar and being normally biased toward said control bar, a roller fixed to the other end of the control arm, a cam fixed to the drawer frame and engaging the roller in the closed position of the drawer to move the arm against the bias to a position allowing movement of the control bar and crisper lid to the position of sealing engagement with the food pan.

7. A food server construction comprising insulated walls defining an enclosure, at least one drawer opening in the enclosure, a drawer frame supported by the enclosure and being movable between open and closed positions relative to the enclosure, a food pan carried by said drawer frame, a structural framework within the enclosure being spaced from said walls, said framework including front and rear pairs of vertical supports fixed to horizontal supports, a crisper lid pivoted at one end thereof on said rear vertical supports and adapted to rest upon and seal said food pan in the closed position of the drawer, a slot formed in one of the front vertical supports, a control bar pivoted at one end thereof to the other of the vertical supports and having the free end thereof extending through said slot, means removably supporting the other end of the crisper lid on the control bar, means responsive to opening of said drawer for raising the free end of the control bar to raise the crisper lid from its sealing engagement with the food pan and responsive to closing of the drawer for allowing said crisper lid to move into sealing engagement with the food pan.

8. A food server construction comprising an enclosure having front and rear walls and a pair of side walls, the front wall having at least one drawer opening therein, a drawer frame supported by the side walls and being movable from closed position within the opening to an extended captive position beyond the opening, a food pan carried by the frame and being removable therefrom, a pair of pivots disposed within the enclosure adjacent the rear wall, a crisper lid disposed within the enclosure and having one end thereof pivotally retained by the pivots, a crisper lid control bar extending between the side walls and being pivotally connected to the enclosure structure adjacent the front wall, means connecting the control bar intermediate its ends to the other end of the crisper lid, an actuating arm pivoted intermediate its ends on the other of said side walls, one end of the actuating arm adapted to support the free end of said bar, means normally biasing said one end of the actuating arm to a position whereby the crisper lid is rotated about the pivots to an inclined position relative to the food pan, a roller fixed to the other end of the operating arm, a cam fixed on said drawer frame and being engaged by said roller upon closing of said drawer to move said actuating arm against said biasing means to a position allowing the crisper lid to rest on said food pan to seal the same.

9. A food server construction comprising an enclosure having front and rear walls and a pair of side walls, the front wall having at least one drawer opening therein, a drawer frame supported by the side walls and being movable from closed position within the opening to an extended captive position beyond the opening, a food pan carried by the frame and being removable therefrom, a pair of pivots disposed within the enclosure adjacent the rear wall, a crisper lid disposed within the enclosure and having one end thereof pivotally retained by the pivots, said crisper lid having a flange having an aperture therein, a crisper lid control bar extending between the side walls and being pivotally connected at one of its ends to the enclosure structure adjacent the front wall, a support pin fixed to the control bar and adapted to be received within the aperture to lock the control bar to the other end of the crisper lid, an actuating arm pivoted intermediate its ends on the enclosure structure, one end of the actuating arm adapted to support the free end of said control bar, means normally biasing said one end of the actuating arm to a position whereby the crisper lid is rotated about the pivots to an inclined position relative to the food pan, a roller fixed to the other end of the operating arm, a cam fixed on said drawer frame and being engaged by said roller upon closing of said drawer to move said actuating arm against said biasing means to a position allowing the crisper lid to rest on said food pan to seal the same, said enclosure including locking means for biasing the drawer into sealing engagement with the enclosure in the closed position of said drawer.

10. A food server construction comprising an enclosure having front and rear walls and a pair of side walls, the front wall having at least one drawer opening therein, a drawer frame supported by the side walls and being movable from closed position within the opening to an extended captive position beyond the opening, a food pan carried by the frame and being removable therefrom, a pair of pivots on the side walls adjacent the rear wall, a crisper lid disposed within the enclosure said crisper lid being generally planar and having at least one peripheral flange at the front portion thereof, a locking aperture formed in said flange centrally thereof, a flexible spring-like crisper lid control bar pivoted at one end thereof on one of said front vertical supports and having the free end thereof extending through said slot in the other of said front vertical supports a support pin fixed to said control bar intermediate its extremities and adapted to be received within said aperture to lock said crisper lid to said control bar, means adapting said control to be manually flexed to withdraw said locking pin from said aperture to release said crisper lid, an actuating arm pivoted intermediate its ends on the other of said vertical supports and having one end thereof disposed adjacent said slot and adapted to support the free end of said control bar, a roller mounted at the other extremity of the actuating arm, a cam fixed to the drawer frame and engaging said roller to move said arm in a direction allowing lowering of said control bar and crisper lid.

11. A food server construction comprising an enclosure having a drawer opening defined therein, a framework within the enclosure having front and rear pairs of vertical supports, a drawer frame carried by the vertical supports and being movable between open and closed positions, a food pan carried by said drawer frame a crisper lid within the enclosure and pivoted at one end thereof on said rear pair of vertical supports, means retaining the other end of the crisper lid and adapted to raise or lower said other end of said crisper lid about said pivotal connection responsive respectively to opening and closing of said drawer frame, whereby upon opening of said drawer frame said other end of said crisper lid will be automatically raised clear of said food pan, said drawer frame including means for preventing engagement between the crisper lid and food pan during opening and closing of said drawer frame, means applying a bias to the drawer frame in the closed position to maintain the drawer frame in its closed position.

12. A food server construction as set forth in claim 11, said pivotal connection comprising a pivot pin on each of the rear vertical supports, a pair of slots defined in said one end of said crisper lid, said slots being substantially wider than the diameter of said pins whereby said crisper lid is allowed vertical movement relative to the pivot pins.

13. A food server construction as set forth in claim 11, said drawer biasing means comprising a pair of rollers supported by the enclosure and being biased one toward the other, a locking pin fixed to the drawer frame and having a locking head at thereon, said head having opposed inner and outer tapered surfaces defining an intermediate enlarged portion, said head upon closing of the drawer frame moving between the rollers sufficiently to cause the rollers to rest upon the inner tapered surface and to impart a longitudinal force tending to bias the drawer in its closing direction.

14. A food server construction as set forth in claim 11, including means for preventing contact between said crisper lid and said food pan during opening and closing of said drawer frame.

References Cited by the Examiner
UNITED STATES PATENTS

| | | | |
|---|---|---|---|
| 2,690,949 | 10/1954 | Reifenberg | 312—270 |
| 2,846,286 | 8/1958 | Gomersall | 312—270 |
| 2,942,926 | 6/1960 | Pavelka | 312—270 |

CHANCELLOR E. HARRIS, *Acting Primary Examiner.*

F. DOMOTOR, *Examiner.*